United States Patent
Chen et al.

(10) Patent No.: US 6,418,449 B1
(45) Date of Patent: Jul. 9, 2002

(54) METHOD OF CLONING THE FILE SYSTEM OF A WINDOW WEB OPERATING SYSTEM BY USING A BITMAP FILE

(75) Inventors: Tong-S Chen; Kuang-Shin Lin, both of Taipei (TW); Hai-Hong Zhang, Tientsin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/478,087

(22) Filed: Jan. 6, 2000

(51) Int. Cl.$^7$ .............................................. G06F 17/30
(52) U.S. Cl. ..................... 707/104.1; 707/102; 707/200; 709/219
(58) Field of Search ......................... 707/1, 5, 10, 100, 707/104.1, 101, 102, 200, 201, 202, 203; 711/161, 162, 173; 709/203, 212, 219, 221; 717/11

(56) References Cited

U.S. PATENT DOCUMENTS

| | | | | |
|---|---|---|---|---|
| 5,086,502 A | * | 2/1992 | Malcolm | 714/8 |
| 5,430,870 A | * | 7/1995 | Stanton et al. | 707/2 |
| 5,438,671 A | * | 8/1995 | Miles | 709/219 |
| 5,469,573 A | * | 11/1995 | McGill et al. | 707/200 |
| 5,640,556 A | * | 6/1997 | Tamura | 707/10 |
| 5,655,119 A | * | 8/1997 | Davy | 707/200 |
| 5,671,439 A | * | 9/1997 | Klein et al. | 710/1 |
| 5,706,472 A | * | 1/1998 | Ruff et al. | 711/112 |
| 5,761,678 A | * | 6/1998 | Bendert et al. | 707/200 |
| 5,761,680 A | * | 6/1998 | Cohen et al. | 707/206 |
| 5,819,292 A | * | 10/1998 | Hitz et al. | 707/203 |
| 5,963,962 A | * | 10/1999 | Hitz et al. | 707/201 |
| 5,970,496 A | * | 10/1999 | Katzenberger | 707/102 |
| 6,035,379 A | * | 3/2000 | Raju et al. | 711/162 |
| 6,108,697 A | * | 8/2000 | Raymond et al. | 709/218 |
| 6,144,999 A | * | 11/2000 | Khalidi et al. | 709/219 |
| 6,179,492 B1 | * | 1/2001 | Guy et al. | 717/11 |
| 6,185,575 B1 | * | 2/2001 | Orcutt | 707/200 |
| 6,253,300 B1 | * | 6/2001 | Lawrence et al. | 711/112 |

FOREIGN PATENT DOCUMENTS

| GB | 2357604 A | * | 6/2001 | G06F/9/445 |

OTHER PUBLICATIONS

Abdul–Fatah, Istabrak et al., "Performance of Cobra–Based Client–Server Architectures", IEEE Transaction on Parallel And Distributed Systems, vol. 13, No. 2, Feb. 2002, pp. 111–127.*

Aversano, Lerina et al., "Web Site Reuse: Cloning and Adapting", Proceedings of the 3rd International Workshop on Site Evolution, 2001, pp. 1–5.*

Popek, Gerald et al., "Replication in Ficus Distributed File Systems", Proceedings of the Workshop on the Management of Replicated Data, Nov. 8–9, 1990, pp. 5–10.*

\* cited by examiner

*Primary Examiner*—Kim Vu
*Assistant Examiner*—Shahid Alam
(74) *Attorney, Agent, or Firm*—Bacon & Thomas

(57) ABSTRACT

A method of cloning the file system of a window web operating system by using a bitmap file includes the steps of (i) storing file data from a source partition in a bitmap file, (ii) compressing the data of the source partition into an image file and cloning the image file to an object disk, (iii) decompressing the compressed bitmap file of the source partition in an object partition in the object disk, enabling decompressed data to be restored to the object partition, and (iv) modifying the bitmap file subject to the size of the object partition and the physical parameters of the object disk.

10 Claims, 8 Drawing Sheets

METHOD OF CLONING THE FILE SYSTEM OF A WINDOW WEB OPERATING SYSTEM BY USING A BITMAP FILE

BACKGROUND OF THE INVENTION

The present invention relates to a method of cloning a file system of a window web operating system by using a bitmap file, and more particularly to a method of cloning a file system by a bitmap file under the Microsoft Windows NT operating system.

Clone techniques are intensively used in mass production operations in computer production lines. These techniques commonly make the OS (Operating System) and Source File System Partition (hereinafter referred to as Source Partition) into a compressed file, then clone the compressed file onto every object disk, and then decompress the file, so as to produce object disks identical to the original Source Partition. These clone techniques greatly improve computer mass production efficiency. Further, conventional file clone techniques can also be applied to the preparation of a computer system copy for use in restoring the system when the computer system fails. Conventionally, file clone techniques adopt a regular procedure to compress file data in proper order. This operation speed is slow. Recently, a file clone technique has been developed, which, as shown in FIG. 1, compresses files rapidly without being in conformity with the order of the files. However, under Microsoft's NT Operation System, this file clone technique is based on the File System. This technique compresses the content of the source partition subject to a Master File Table (hereinafter referred to as MFT), forming an Image File, and then decompresses the file after having been cloned to every object disk. During this process, the system inspects all information in the table of contents, finds out all files in the source partition and modifies the MFT in the object partition subject to the information on the size and partition condition included in the object disk. Because the NT File system (hereinafter referred to as NTFS) records file information in multiple addresses, a new partition cloned by means of the aforesaid file clone technique shows different file information at different addresses when the size of the source partition and the size of the object disk are different. This difference destroys the stability and unity of the system, preventing the file clone operation from proceeding, or even causing the partition to crash. Furthermore, the operation procedure of this file clone technique is complicated and slow, and weak in system protection.

SUMMARY OF THE INVENTION

The present invention has been accomplished to provide a file system clone technique, which eliminates the aforesaid drawbacks. The file system clone technique of the invention is to clone data but not the file. Therefore, it is not necessary to re-build the MFT in the object partition, so that the safety and unity of the system are ensured. The method of the present invention greatly increases file clone speed. The advantages of the present invention become more significant when the size of the source partition and the size of the object disk are different. According to one aspect of the present invention, the file system cloning method uses a bitmap file to clone the NT file system. During the data cloning process, few files are changed, and it is not necessary to rebuild the object partition MFT. Further, data access is directly made through the file system. Therefore, the file system cloning speed is high. According to another aspect of the present invention, the file system cloning method does not need to re-construct object partition MFT. Therefore, the procedure does not modify file recording information in the partition, and the safety and unity of NT file system are ensured. According to still another aspect of the present invention, the operation procedure of the file system cloning method of the present invention is simple, and a user can easily complete the clone of a NT file system without knowing the system internal structure.

DETAILED DESCRIPTION OF THE PREFERRED EMBODIMENT

Figure 1:
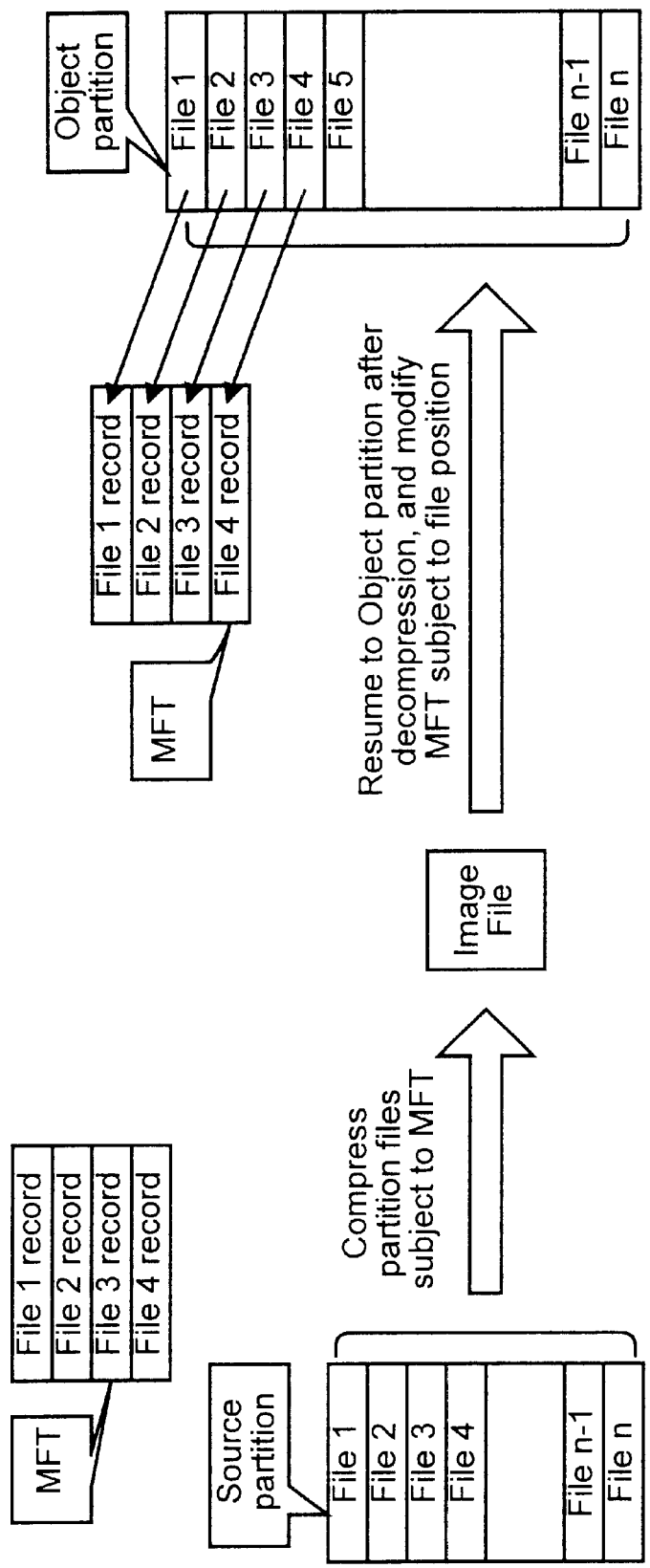
FIG. 1 is a schematic drawing explaining the operation of the prior art file system clone technique.
Figure 2:
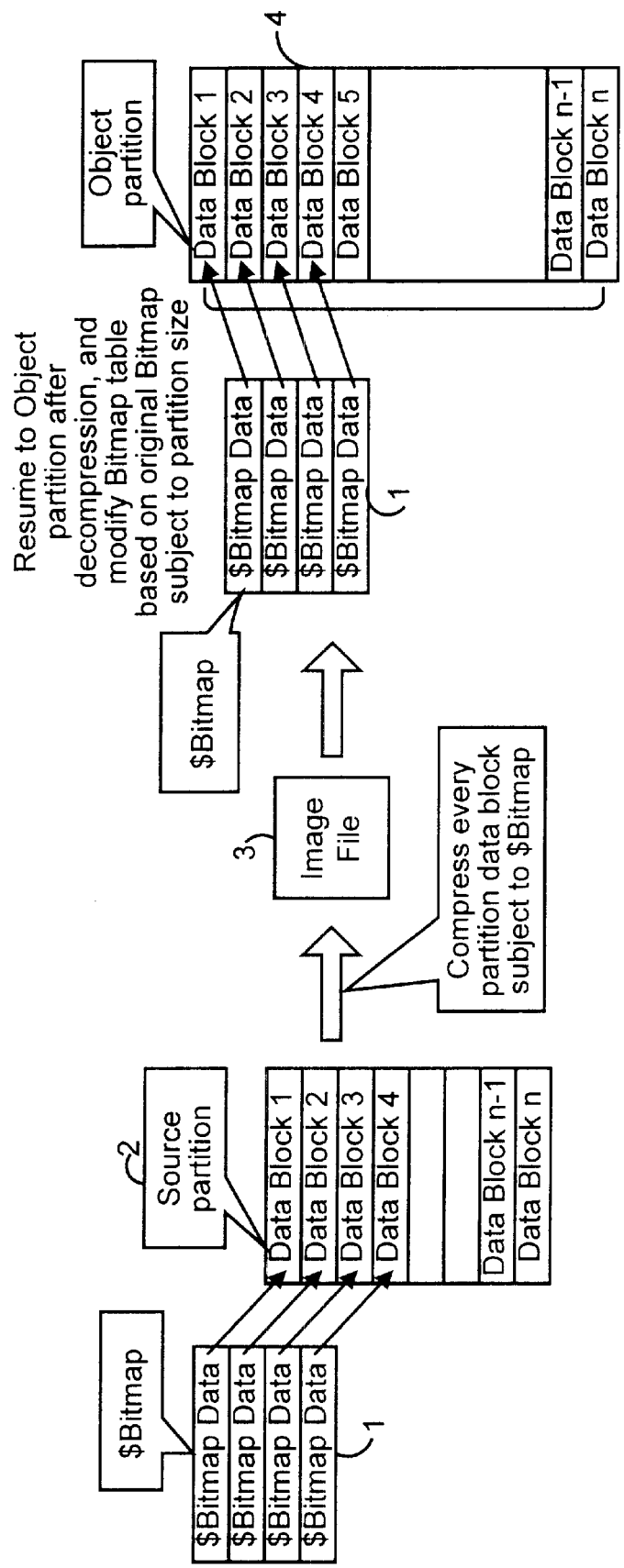
FIG. 2 is a schematic drawing explaining the operation of the file system clone technique of the present invention.

Referring to FIG. 2, data from Source Partition 2 is stored in Bitmap File (Bitmap Table) 1 in the form of a Data Block, and then the Data Block of Source Partition 2 is compressed into Image File 3 subject to Bitmap File 1. After Image File 3 has been duplicated onto the target disk, compressed Bitmap File 1 of Source Partition 2 is decompressed in Object Partition 4 in the Object disk. Then, Bitmap File 1 is modified according to the size variation from the Source Partition 2 to Object Partition 4, subject to the size of the Object Partition and physical parameters of the Object Disk.

Figure 3:
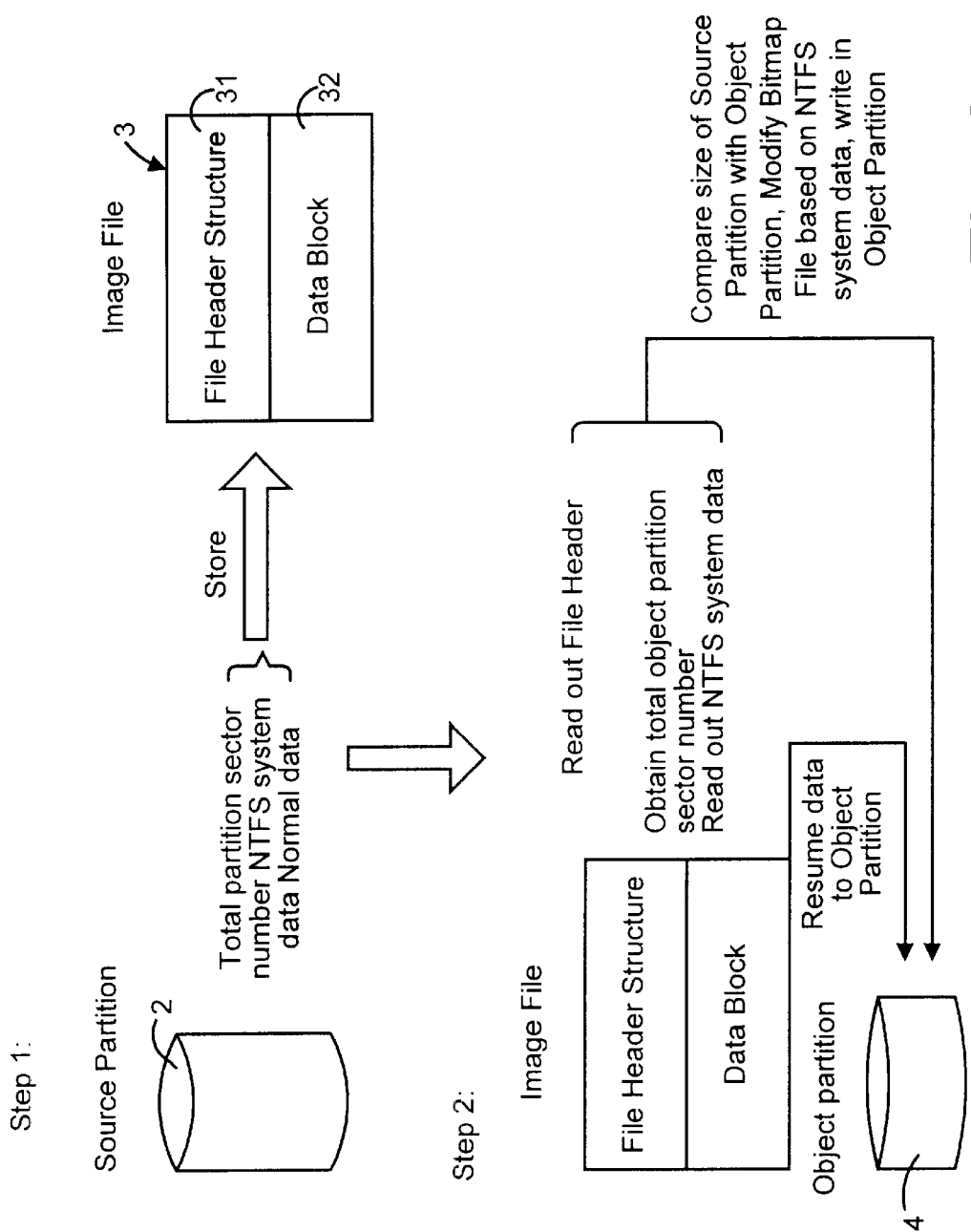
FIG. 3 illustrates the operation architecture of the present invention.

The clone technique of the invention is to clone the File System of Source Partition 2 to Object Partition 4 by Bitmap File 1, enabling the data in Object Partition 4 to be maintained in conformity with the data in Source Partition 2 after decompression. The clone technique includes the following two procedures as shown in FIG. 3.

(1) Arrange the data in Source Partition 2, then set up the data into an Image File subject to one Bitmap File of the data, enabling the initial position of the Image File 3 to be stored in an Image File Header Structure 31, which is stored with certain important physical parameters of Source Partition 2, such as total sectors, partition information, etc.

(2) Read out the Image File 3 and resume storage data to the Object Partition 4 of one Object Disk. During reading, the parameters in the Image File Header Structure 31 are read first, then the sizes of the Source Partition 2 and the Object Partition 4 are compared, the Bitmap File and related parameters are modified subject to the size of the Object Partition 4, the modified data is written into the Object Partition 4, and the content of the data block of the Source Partition 2 is cloned to the Object Partition 4 of the Object Disk.

Figure 4:
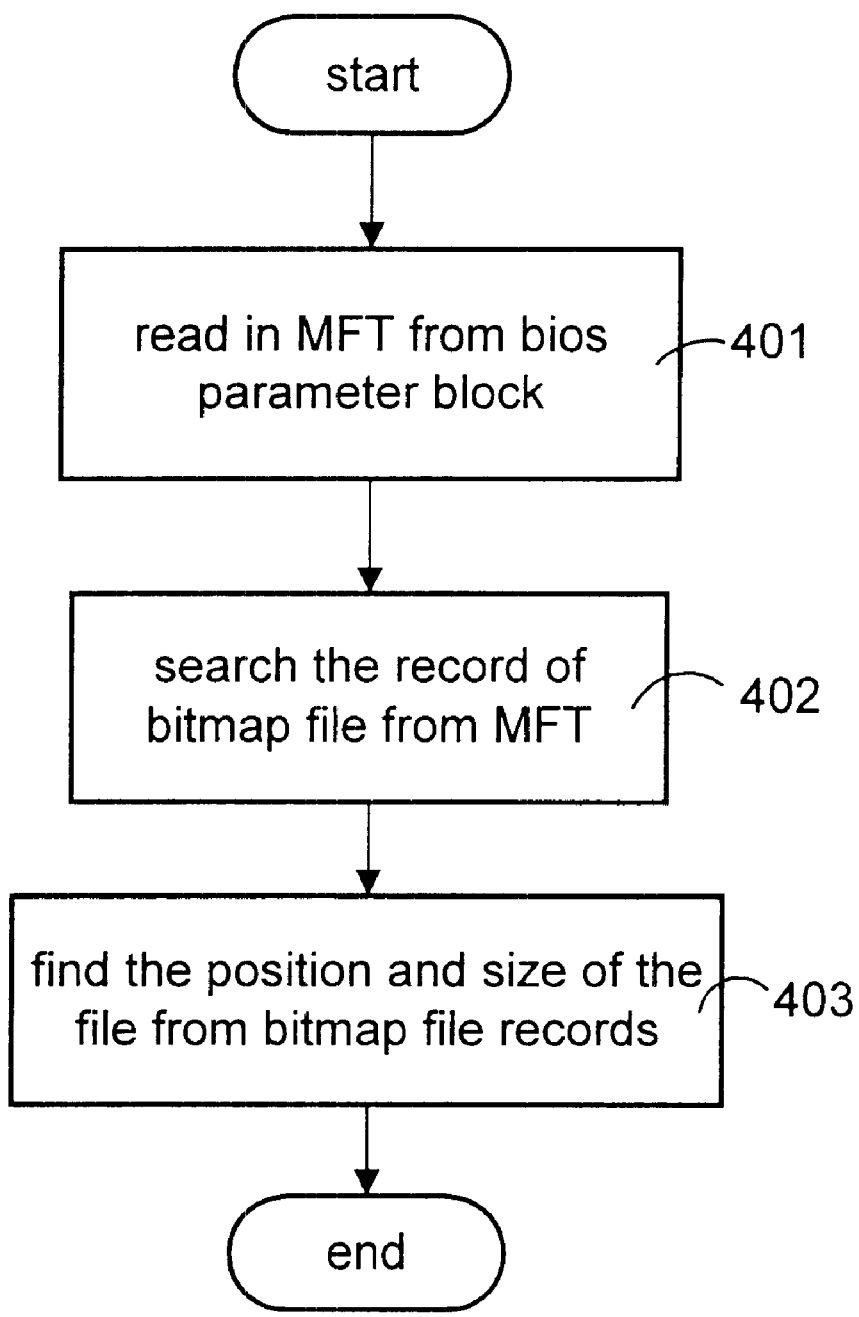
FIG. 4 is a flow chart explaining the procedure of making an image file according to the present invention.

Because the Bitmap File exists in the file system partition, equivalent to the FAT table of a FAT format, when searching the address of Bitmap File, as shown in FIG. 4, the position of the MFT Table is obtained from the Boot sector of Source Partition (401). The record of the Bitmap File from the first 20 records in MFT Table (402) is then searched to find the physical address and size of the Bitmap File from the records (403), so as to obtain the actual address and size of the Bitmap File, and the useful data can thus be read out from Source Partition, preventing useless data from appearing in the Image File, so that the size of Image File can be minimized to improve hard disk clone speed.

Figure 5:
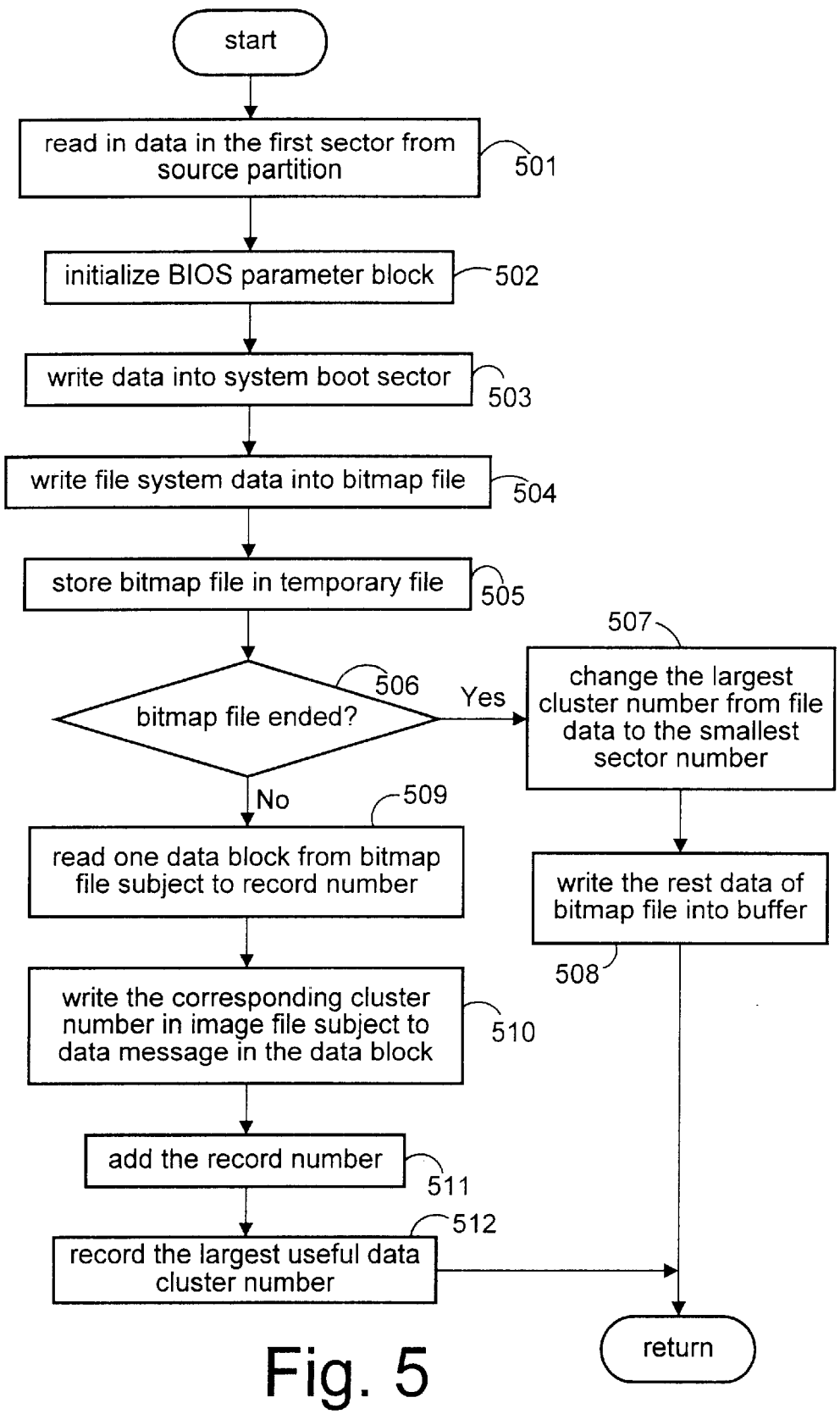
FIG. 5 is a flow chart explaining the procedure of finding bitmap file according to the present invention.

When making the Image File, as shown in FIG. 5, the data in the first sector is read from Source Partition (501), the Parameter Block of BIOS parameters (502) is initialized, and the Parameter Block is written into the Boot Sector in Source Partition (503), the file system data is written into the Bitmap File (504), the Bitmap file is read in and stored in a Temporary File in Buffer (505), and a judgement is made as to whether the Bitmap File reading action has been terminated (506). If the Bitmap File has all been read out, the largest cluster number from the file data is changed to the smallest sector number (507), the rest of the data in the Bitmap File is written into Buffer (508), and then the system returns to the step of reading sector data from the Source Partition. If the Bitmap File reading action continues, one data block is read from Bitmap File subject to record number (509), the corresponding cluster number in the Image File is written subject to the data message in the data block (510), the record number of the data block is added, the largest useful data cluster number (512) is recorded, and the system then returns to the step of reading sector data from Source Partition.

Figure 6:
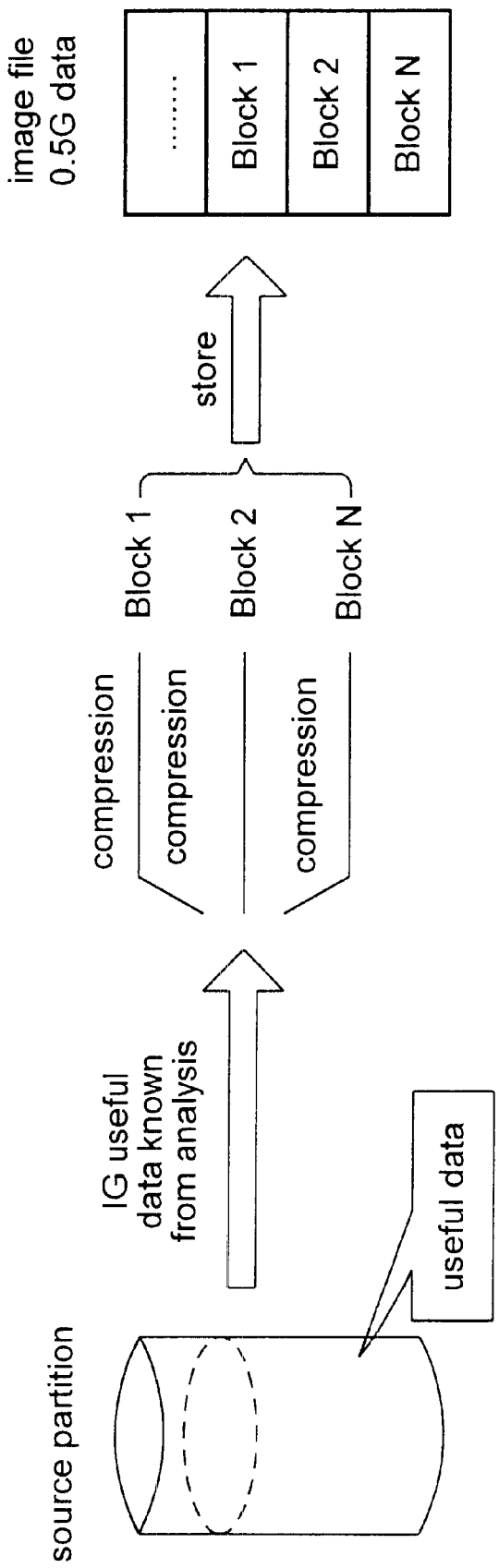
FIG. 6 is a schematic drawing showing the compression process architecture according to the present invention.

The invention divides all useful data in the Source Partition into several Data Blocks, as illustrated in FIG. 6, compresses every Data Block, and then stores compressed data of every Data Block into Image File. This procedure enables the size of the Image File to be minimized.

Figure 7:
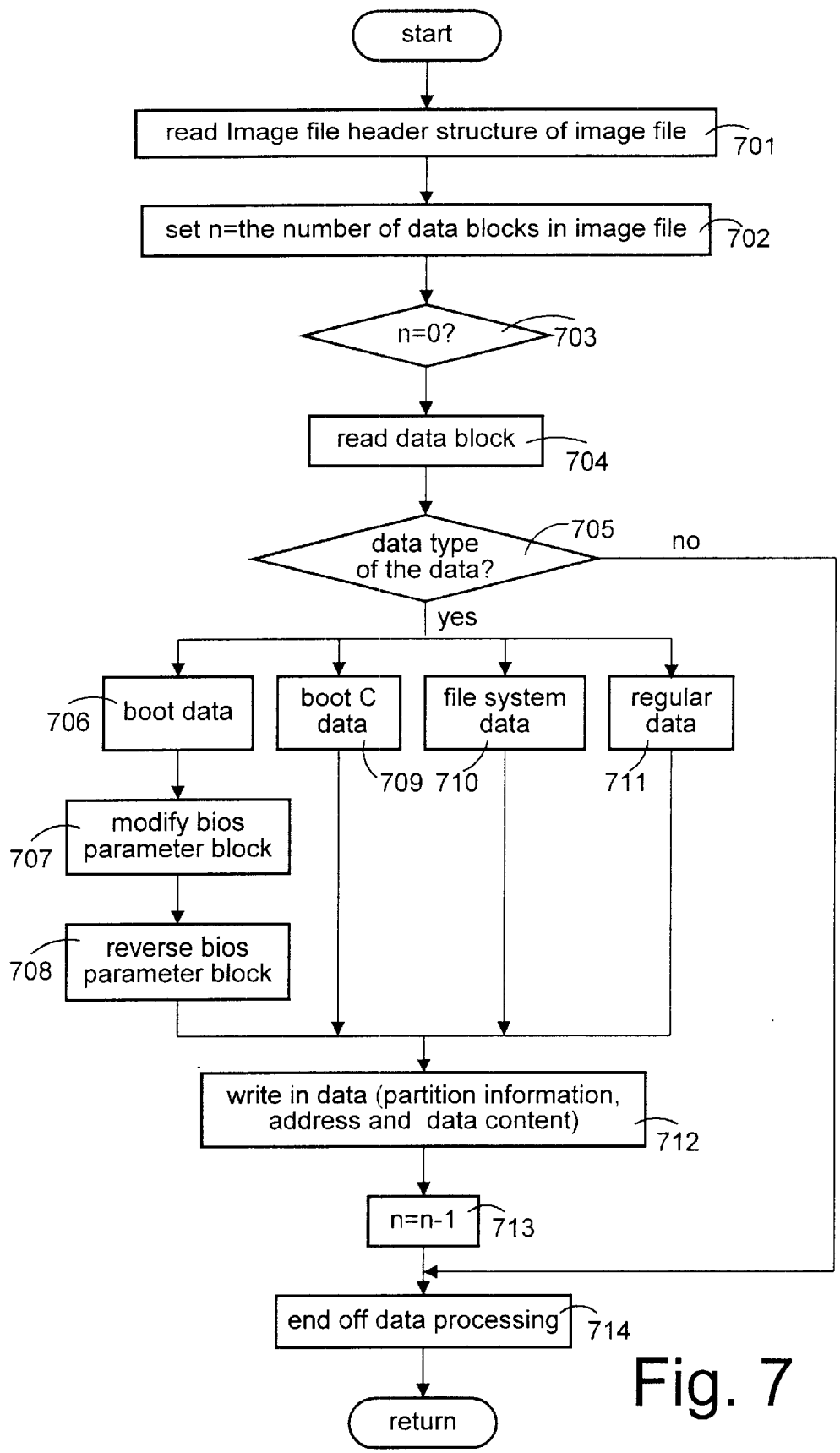
FIG. 7 is a flow chart explaining the procedure of decompressing a bitmap file to object partition according to the present invention.

When cloning the File System from the Source Partition to the Object Partition, the Image File is decompressed, and then Bitmap File of the Source Partition is modified subject to the size of the Object Partition. The decompression processing procedure is shown in FIG. 7. When proceeding to the decompression processing procedure, the system reads the Image File Header Structure of the Image File (701), which is stored with certain important physical parameters of Source Partition 2 that describe the characteristics of the Source Partition such as total sectors, partition information, etc. Then, the value of "n" is set subject to the number of data blocks in the Image File (702), and the step of judging whether the set value "n" surpasses zero or not is carried out. If the answer is positive, the system reads the data from the corresponding Data Block (704), and then judges the Data Type of the data (705). If the data is Boot data (706), the system immediately modifies the BIOS Parameter Block of the Object Partition (707), and then reserves the modified result (708). If the data is of Boot C data (709), File System data (710), or regular data (711), the system writes the data, which contains a Partition message, write-in address and data content, etc., reserves the Parameter Block into the data sector of the Object Partition (712), sets Data Block number n=n-1, ends data processing (713), and repeats the aforesaid processing procedure to read the Image File Header Structure of the Image File again. The data decompression processing procedure is terminated when the content of all Data Blocks of Image File has been completely processed (i.e., n≦0).

Bitmap File modification includes the following three modification conditions subject to the size of the Object Partition obtained:

(1) When Object Partition≦Partition, the system simply sets a Bitmap File end sign in the original Bitmap File at the position which represents the end of the Object Partition.

(2) When Object Partition>Source Partition and the original Bitmap-File represents the position of the end of the Object Partition, the system clears all redundant data before the end of Object Partition, and then sets a Bitmap File end sign at the position of the end of the Object Partition.

(3) When Object Partition>Source Partition but the original Bitmap File does not represent the position of the end of the Object Partition, the system finds a new position in the Object Partition, sets a new Bitmap File, clones the content of the original Bitmap File to the new position, clears all redundant data before the end of the Object Partition, and then sets a Bitmap File end sign in the position of the end of the Object Partition.

Figure 8:
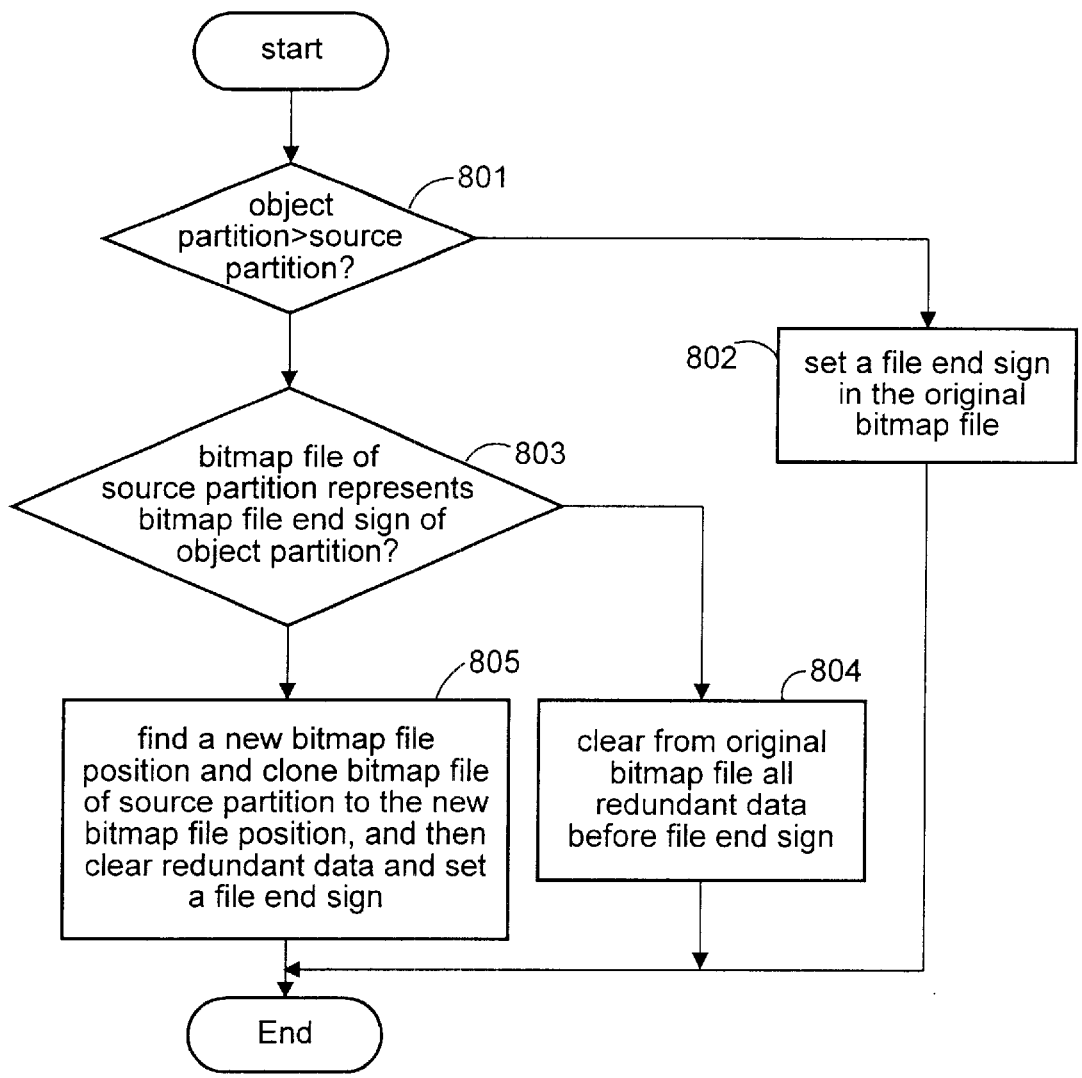
FIG. 8 is a flow chart explaining the procedure of modifying a bitmap file.

When modifying the Bitmap File, as shown in FIG. 8, the system judges if Object Partition>Source Partition (801). When Object Partition≦Source Partition, a File end sign is set in the original Bitmap File (802); when Object Partition>Source Partition, the system judges if the Bitmap File of the Source Partition can represent the Bitmap File end sign of Object Partition or not, so as to clear from the original Bitmap File all redundant data before the File end sign (804) in case the answer is positive. If the Bitmap File of the Source Partition cannot represent the Bitmap File end sign of the Object Partition, the system finds a new Bitmap File position, clones the Bitmap File of Source Partition to the new Bitmap File position, and then clears redundant data and sets a File end sign (805).

In an application example of the present invention, the size of Source Partition is 200 Mb (Mega byte), and it is divided into 400 Data Blocks including 100 useful Data Blocks. When making an Image File, Boot sector data is written into the Image File, and at last, important physical parameters in the Source Partition such as Total Sectors, Partition Information, etc., are written into Image File Header Structure and thus the Image File is done.

In the aforesaid application example, if the size of the Object Partition is 150 Mb when restoring the Source Partition File to the Object Partition, the system reads the total number of Data Blocks the from Image File Header Structure of Image File, restores in proper order the Boot sector data, the data of 100 Data Blocks, and the Bitmap File, and then sets the Partition End Sign at 150M. If the size of Object Partition is 300 Mb, the system sets the Partition End Sign at 300 Mb, and clears from the Bitmap File redundant data between 200 Mb and 300Mb.

It is to be understood that the drawings are designed for purposes of illustration only, and are not intended for use as a definition of the limits and scope of the invention disclosed.

What the invention claimed is:

1. A method of cloning a file system of a window web operating system by using a bitmap file, comprising the steps of (i) storing file data from a source partition in a bitmap file, (ii) compressing the data of the source partition into an image file and cloning the image file to an object disk, (iii) decompressing the compressed bitmap file of the source partition in an object partition in the object disk, enabling decompressed data to be restored to the object partition, and (iv) modifying the bitmap file subject to the size of the object partition and the physical parameters of the object disk, wherein when storing said file data from said source partition in said bitmap file, a position of a master file table (MFT) is found from a boot sector of said source partition, and then a first 20 records in the MFT are searched, so as to find a physical address and size of the bitmap file from the records, and to further obtain an actual address and size of the bitmap file.

2. The method of claim 1 wherein all useful data in said source partition is divided into a plurality of data blocks, the data in each data block is compressed, and the compressed data is decompressed and stored in the image file.

3. The method of claim 1 wherein an initial address is stored in a file header structure, which is stored with physical parameters including a total number of sectors and partition information.

4. The method of claim 1 wherein when the object partition is less than or equal to the source partition, a bitmap file end sign is set in the original bitmap file at a position which represents an end of the object partition to end modification of the bitmap file.

5. A method of cloning a file system of a window web operating system by using a bitmap file, comprising the steps of (i) storing file data from a source partition in a bitmap file, (ii) compressing the data of the source partition into an image file and cloning the image file to an object disk, (iii) decompressing the compressed bitmap file of the source partition in an object partition in the object disk, enabling decompressed data to be restored to theobject partition, and (iv) modifying the bitmap file subject to the size of the object partition and the physical parameters of the object disk, wherein all useful data in said source partition is divided into a plurality of data blocks, the data in each data block is compressed, and the compressed data is decompressed and stored in the image file, and wherein when making the image file, data in a first sector is read from the source partition, a parameter block containing BIOS parameters is initialized, the parameter block is then read into a boot sector of the source partition, file system data is read into said bitmap file, the bitmap file is read and stored in a temporary file in a buffer, a judgement is made as to whether the bitmap file reading action has been terminated, and a largest cluster number from the file system data is changed to a smallest sector number and a remainder of the data in the bitmap file is written into the buffer if the bitmap file has all been read out, followed by return to the step of reading sector data from the source partition.

6. The method of claim 5 wherein if the bitmap file reading action continues when making the image, one data block is read from the bitmap file subject to a record number, a corresponding cluster number is written to the image file subject to a data message in the data block, the record number of the data block is added, and a largest useful data cluster number is recorded, followed by return to the step of reading sector data from the source partition.

7. A method of cloning a file system of a window web operating system by using a bitmap file, comprising the steps of (i) storing file data from a source partition in a bitmap file, (ii) compressing the data of the source partition into an image file and cloning the image file to an object disk, (iii) decompressing the compressed bitmap file of the source partition in an object partition in the object disk, enabling decompressed data to be restored to the object partition, and (iv) modifying the bitmap file subject to the size of the object partition and the physical parameters of the object disk, wherein an initial address is stored in a file header structure, which is stored with physical parameters including a total number of sectors and partition information, and wherein when decompressing the image file, parameters of an image file header of the image file are read, a size of the source partition is compared with the object partition, the bitmap file and related parameters are modified subject to a comparison result, the modified data is written into the object partition, and a content of the data blocks of the source partition is cloned to the object partition of the object disk.

8. The method of claim 7 wherein when cloning the file system from the source partition to the object partition, a value of "n" is set subject to a number of data blocks in the image file, and whether the set value "n" surpasses zero or not is judged, so as to read data from a corresponding data block is read and a data type of the data is determined is the set value "n" surpasses zero, a BIOS parameter block of the object partition is modified and the modified result is restored if the data is boot data, or the data and the restored parameter block is written into a data sector of the object partition if the data is file system data or regular data, followed by return to the step of reading the data of the image file header structure and repeating the procedure until the content of all data blocks of the image file has been completely processed, at which time n<0.

9. A method of cloning a file system of a window web operating system by using a bitmap file, comprising the steps of (i) storing file data from a source partition in a bitmap file, (ii) compressing the data of the source partition into an image file and cloning the image file to an object disk, (iii) decompressing the compressed bitmap file of the source partition in an object partition in the object disk, enabling decompressed data to be restored to the object partition, and (iv) modifying the bitmap file subject to the size of the object partition and the physical parameters of the object disk, wherein when the object partition is greater than the object partition and the original bitmap file represents a position of an end of the object partition, all redundant data is cleared before the end of the object partition, and a bitmap file end sign is set at a position of the end of the object partition to end modification of the bitmap file.

10. A method of cloning a file system of a window web operating system by using a bitmap file, comprising the steps of (i) storing file data from a source partition in a bitmap file, (ii) compressing the data of the source partition into an image file and cloning the image file to an object disk, (iii) decompressing the compressed bitmap file of the source partition in an object partition in the object disk, enabling decompressed data to be restored to the object partition, and (iv) modifying the bitmap file subject to the size of the object partition and the physical parameters of the object disk, wherein when the object partition is greater than the source partition but the original bitmap file does not represent a position of the end of the object partition, a new position is found, a content of the original object partition is cloned, and a bitmap file end sign is set at a position of the end of the object partition to end modification of the bitmap file.

* * * * *